United States Patent
Adsumilli et al.

(10) Patent No.: US 10,134,114 B2
(45) Date of Patent: Nov. 20, 2018

(54) APPARATUS AND METHODS FOR VIDEO IMAGE POST-PROCESSING FOR SEGMENTATION-BASED INTERPOLATION

(71) Applicant: GoPro, Inc., Carlsbad, CA (US)

(72) Inventors: Balineedu Chowdary Adsumilli, San Francisco, CA (US); Ryan Lustig, Encinitas, CA (US); Aaron Staranowicz, Carlsbad, CA (US)

(73) Assignee: GOPRO, INC., San Mateo, CA (US)

(*) Notice: Subject to any disclaimer, the term of this patent is extended or adjusted under 35 U.S.C. 154(b) by 58 days.

(21) Appl. No.: 15/270,971

(22) Filed: Sep. 20, 2016

(65) Prior Publication Data

US 2018/0082404 A1  Mar. 22, 2018

(51) Int. Cl.
G06K 9/00 (2006.01)
G06T 5/00 (2006.01)
G06T 3/40 (2006.01)

(52) U.S. Cl.
CPC ............ *G06T 5/002* (2013.01); *G06T 3/4007* (2013.01); *G06T 5/003* (2013.01)

(58) Field of Classification Search
CPC ........ G06T 5/002; G06T 5/003; G06T 3/4007
See application file for complete search history.

(56) References Cited

U.S. PATENT DOCUMENTS

| | | | |
|---|---|---|---|
| 4,179,704 A | 12/1979 | Kaiser et al. | |
| 6,504,569 B1 | 1/2003 | Jasinschi et al. | |
| 6,611,607 B1 | 8/2003 | Davis et al. | |
| 6,625,333 B1 * | 9/2003 | Wang | G06T 3/4007 345/606 |
| 6,728,317 B1 | 4/2004 | Demos | |
| 6,996,244 B1 | 2/2006 | Slaney et al. | |
| 7,750,904 B2 | 7/2010 | Jojic et al. | |
| 8,290,253 B1 | 10/2012 | Wang et al. | |
| 8,606,073 B2 | 12/2013 | Woodman | |
| 9,171,577 B1 | 10/2015 | Newman et al. | |
| 9,396,588 B1 | 7/2016 | Li | |

(Continued)

OTHER PUBLICATIONS

Chan T.F. and Vese LA., "Active contours without edges". IEEE Transactions on Image Processing, 2001, 10 (2), pp. 266-277 (hereinafter "Chan").

(Continued)

*Primary Examiner* — John Strege
(74) *Attorney, Agent, or Firm* — Gazdzinski & Associates, PC (57) ABSTRACT

Apparatus and methods for video image post-processing for segmentation based interpolation. In one embodiment, a computerized apparatus is utilized in order to obtain a first frame of video data; segment one or more objects within the first frame of video data; obtain a second frame of video data; segment one or more objects within the second frame of video data; match at least a portion of the one or more objects within the first frame of video data with the one or more objects within the second frame of video data; compute the motion of the pixels for the matched portion of the one or more objects; compute the motion of pixels associated with a background image; and generate an interpolated frame of video data, the interpolated frame of video data residing temporally between the first frame of video data and the second frame of video data.

20 Claims, 8 Drawing Sheets

(56) References Cited

U.S. PATENT DOCUMENTS

| | | | |
|---|---|---|---|
| 9,547,908 | B1 | 1/2017 | Kim et al. |
| 9,575,803 | B2 | 2/2017 | Chauvet et al. |
| 2003/0007567 | A1 | 1/2003 | Newman et al. |
| 2003/0147547 | A1 | 8/2003 | Lin et al. |
| 2004/0017504 | A1 | 1/2004 | Prandoni et al. |
| 2004/0131229 | A1 | 7/2004 | Acharya et al. |
| 2004/0246374 | A1* | 12/2004 | Mishima ............ H04N 7/0132 348/441 |
| 2005/0047672 | A1* | 3/2005 | Ben-Ezra ............ H04N 5/2258 382/255 |
| 2005/0117805 | A1 | 6/2005 | Poutet et al. |
| 2006/0071825 | A1 | 4/2006 | Demos |
| 2006/0251289 | A1 | 11/2006 | Williams et al. |
| 2007/0110298 | A1 | 5/2007 | Graepel et al. |
| 2008/0008243 | A1* | 1/2008 | Ozdemir ............ G06T 3/4007 375/240.16 |
| 2008/0069478 | A1* | 3/2008 | Ohwaki ............ G06T 3/4007 382/300 |
| 2008/0170626 | A1 | 7/2008 | Sung et al. |
| 2008/0180439 | A1 | 7/2008 | Adabala et al. |
| 2008/0231745 | A1* | 9/2008 | Ogino ............ G06T 3/4007 348/441 |
| 2008/0270569 | A1 | 10/2008 | McBride et al. |
| 2009/0132371 | A1 | 5/2009 | Strietzel et al. |
| 2009/0153730 | A1 | 6/2009 | Knee et al. |
| 2009/0324191 | A1 | 12/2009 | Reusens et al. |
| 2010/0177977 | A1 | 7/2010 | Seshadri et al. |
| 2010/0266157 | A1 | 10/2010 | Shin et al. |
| 2011/0001884 | A1* | 1/2011 | Iketani ............ H04N 5/145 348/699 |
| 2011/0286625 | A1 | 11/2011 | Petrovic et al. |
| 2012/0002112 | A1 | 1/2012 | Huang et al. |
| 2012/0063670 | A1 | 3/2012 | Woo |
| 2012/0170805 | A1 | 7/2012 | Brown et al. |
| 2012/0281871 | A1 | 11/2012 | Reed et al. |
| 2013/0314442 | A1 | 11/2013 | Langlotz et al. |
| 2014/0022394 | A1 | 1/2014 | Bae et al. |
| 2014/0050454 | A1 | 2/2014 | Slotte |
| 2014/0063061 | A1 | 3/2014 | Reitan |
| 2014/0267801 | A1 | 9/2014 | Grundmann et al. |
| 2014/0320682 | A1* | 10/2014 | Kuwabara ............ H04N 5/357 348/208.6 |
| 2015/0371447 | A1 | 12/2015 | Yasutake |
| 2016/0057363 | A1 | 2/2016 | Posa |
| 2016/0080830 | A1 | 3/2016 | Kim et al. |
| 2016/0125633 | A1 | 5/2016 | Windmark et al. |
| 2016/0205341 | A1 | 7/2016 | Hollander et al. |
| 2016/0239340 | A1 | 8/2016 | Chauvet et al. |
| 2016/0274338 | A1 | 9/2016 | Davies et al. |
| 2016/0358628 | A1 | 12/2016 | Liu et al. |
| 2016/0366396 | A1 | 12/2016 | Kim et al. |

OTHER PUBLICATIONS

Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.
Elen R., "Whatever happened to Arnbisonics" AudioMedia Magazine, Nov. 1991.
Gracias N., et al., "Fast Image Blending Using Watersheds and Graph Cuts," Image and Vision Computing, 2009, vol. 27 (5), pp. 597-607.
Herbst E., et al., "Occlusion Reasoning for Temporal Interpolation Using Optical Flow," Department of Computer Science and Engineering, University of Washington, Tech. Rep. UW-CSE-09-08-01, 2009.
http://www.ambisonic.net/.
http://www.webmproject.org/vp9.
In Computer vision, The proceedings of the seventh IEEE international conference on, 1999, vol. 2, pp. 1150-1157.
Information technology—Coding of audio-visual objects—Part 10: Advanced Video Coding ; ITU-T H.264 ; ISO/IEC 14496-10:2012.
ITU-T Study Group 16—Video Coding Experts Group (VCEG) : ITU-T H.265, and/or ISO/IEC 23008-2:2015.
Jakubowski M., et al., "Block-based motion estimation algorithms—a survey," Opto-Electronics Review 21, No. 1 (2013), pp. 86-102.
Kendall A., et al., "Bayesian Segnet: Model Uncertainty in Deep Convolutional Encoder-Decoder Architectures for Scene Understanding," arXiv preprint arXiv:1511.02680, 2015.
Mitzel D., et al., "Video Super Resolution Using Duality Based TV-I 1 Optical Flow," Joint Pattern Recognition Symposium, 2009, pp. 432-441.
Pérez et al., "Poisson linage Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
SMPTE 2073 family of encoding standards (also known as VC-5); these include without limitation: SMPTE ST 2073-1, SMPTE ST 2073-3, SMPTE ST 2073-4.
Suzuki et al., "Inter Frame Coding with Template Matching Averaging," in IEEE International Conference on Image Processing Proceedings (2007), vol. (III), pp. 409-412.
Szeliski R., "Computer vision: algorithms and applications," Springer Science & Business Media, 2010.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Xiao J., and Quan L., "Multiple View Semantic Segmentation for Street View Images," 2009 IEEE 12th lnternational Conference on Computer Vision, 2009, pp. 686-693.
Achanta R., et al., "Slic Superpixels Compared to State-of-The-Art Superpixel Methods," IEEE Transactions on Pattern Analysis and Machine Intelligence, 2012, vol. 34 (11), pp. 2274-2282.
Allène C., et al., "Seamless Image-based Texture Atlases Using Multi-band Blending," Pattern Recognition, 2008. ICPR 2008. 19th International Conference on, 2008.
Badrinarayanan V., et al, "Segnet: a Deep Convolutional Encoder-Decoder Architecture for Image Segmentation," arXiv preprint arXiv:1511.00561, 2015.
Barghout L. and Sheynin J., "Real-world scene perception and perceptual organization: Lessons from Computer Vision". Journal of Vision, 2013, vol. 13 (9).
Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.
Bay H., et al., "Surf: Speeded up Robust Features," European Conference on Computer Vision, Springer Berlin Heidelberg, 2006, pp. 404-417.
Beier et al., "Feature-Based Image Metamorphosis," in Computer Graphics Journal, Jul. 1992, vol. 26 (2), pp. 35-42.
Brainard R.C., et al., "Low-Resolution TV: Subjective Effects of Frame Repetition and Picture Replenishment," Bell Labs Technical Journal, Jan. 1967, vol. 46 (1), pp. 261-271.
Burt et al., "A Multiresolution Spline with Application to Image Mosaics," in ACM Transactions on Graphics (TOG), 1983, vol. 2, No. 4, pp. 217-236.
Xiong Y., et al., "Gradient Domain Image Blending and Implementation on Mobile Devices," International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.
Adsumilli C., "A dissertation submitted in partial satisfaction of the requirements for the degree of Doctor of Philosophy in Electrical and Computer Enqineerinq", Sep. 2005, 193 paqes.
Adsumilli C. et al., "A Dynamically Adaptive Constrained Unequal Error Protection Scheme for Video Transmission over Wireless (56) References Cited

OTHER PUBLICATIONS

Channels", Proceedings IEEE International Workshop on Multimedia Signal Processing, 2002, pp. 41-44, Virgin Islands, USA.
Adsumilli C. et al., "A Hybrid Constrained Unequal Error Protection and Data Hiding Scheme for Packet Video Transmission", Proceedings IEEE International Conference on Acoustics, Speech, and Signal Processing (ICASSP), Apr. 2003, pp. V680-V683, Hong Kong.
Adsumilli C. et al., A Noise Based Quantization Model for Restoring Block Transform Compressed Images:, Proceedings of the IAST£0 International Conference Signal and Image Processing, Aug. 13-16, 2001, pp. 354-359, Honolulu, Hawaii, USA.
Adsumilli C. et al., "A Robust Error Concealment Technique Using Data Hiding for Image and Video Transmission Over Lossy Channels", IEEE Transactions on Circuits and Systems for Video Technology, Nov. 2005, pp. 1394-1406, vol. 15(11 ).
Adsumilli C. et al., "Adapive Wireless Video Communications: Challenges and Approaches", Proceedings of International Workshop on Packet Video, Apr. 2002, pp. 1-11, Pittsburgh, Pennsylvania, USA.
Adsumilli C. et al., "Detector Performance Analysis of Watermark-Based Error Concealment in Image Communications", Proceedings IEEE International Conference on Image Processing, 2005, pp. 916-919, vol. 3.
Adsumilli C. et al., "Error Concealment in Video Communications by Informed Watermarking", PSIVT, 2006, pp. 1094-1102.
Adsumilli C. et al., "Error Concealment in Video Communications Using DPCM Bit Stream Embedding", Proceedings IEEE International Conference on Acoustics, Speech and Signal Processing (ICASSP), Apr. 2005, pp. 11-169-11-172, Philadelphia, USA.
Baker, et al., "A Database and Evaluation Methodology for Optical Flow" International Journal of Computer Vision 92.1 (2011): 1-31.
Boucherkha, S., et al., "A Lossless Watermarking Based Authentication System for Medical Images", Would Academy of Science, Engineering and Technology, International Journal of Medical, Health, Biomedical, Bioengineering and Pharmaceutical Engineering, 2007, vol. 1, No. 1, pp. 20-23.
Brox, et al., "High Accuracy Optical Flow Estimation Based on a Theory for Warping", European Conference on Computer Vision, Springer-Verlag Berlin Heidelberg, 2004.
Carli M. et al., "Video Watermarking in 30 OCT Domain", Proceedings of International Workshop on Spectral Methods and Multirate Signal Processing, Jun. 2005, pp. 141-144, Riga, Lavia, (Invited Paper).
Cavallaro, et al., "Object-based video: extraction tools, evaluation metrics and applications", Visual Communications and Image Processing; Jul. 8, 2003-Jul. 11, 2003, Lugano Switzerland, XP030080620.

Davis, et al., "The Visual Microphone: Passive Recovery of Sound from Video" (2014).
Didyk, et al., "Joint View Expansion and Filtering for Automultiscopic 3D Displays", ACM Transactions on Graphics (TOG) 32.6 (2013): 221.
Freeman, et al., "Shape-Time Photography" IEEE Computer Society Conference on Computer Vision and Pattern Recognition, vol. 2. IEEE, 2003.
Fridrich, J., et al., "Lossless Data Embedding—New Paradigm in Digital Watermarking", EURASIP Journal on Applied Signal Processing, Oct. 29, 2001, pp. 185-196.
Huang, et al., "Maximum a Posteriori Probability Estimation for Online Surveillance Video Synopsis", IEEE Transactions on Circuits and Systems for Video Technology, IEEE Service Center, Piscataway, NJ, US, vol. 24, No. 8, Aug. 1, 2014 (Aug. 1, 2014), pp. 1417-1429.
Kaur, M., et al., "A Review on Digital Watermarkign Using LSB", International Journal of Advanced Research in Computer Science and Software Engineering, Nov. 2005, vol. 5, Issue 11, pp. 1210-1214.
Schnyder, et al., "Depth image based compositing for stereo 3D", 3DTV-Conference: the True Vision—Capture, Transmlsslon and Display of 3D Video (3DTV-CON), 2012, IEEE, Oct. 15, 2012, pp. 1-4.
Schnyder L., et al., "2D to 3D Conversion of Sports Content using Panoramas," Image Processing (ICIP), 2011, IEEE, pp. 1961-1964.
Schwartz, E., et al., "Implementation of Compression with Reversible Embedded Wavelets," In Proc. SPIE, 1995, 12 pages.
Shannon, "A Mathematical Theory of Communication", Bell Syst. Tech. J., 27:379-423, 623-656, 1948.
Szeliski, et al., "Fast Poisson blending using Multi-Splines." Computational Photography (ICCP), 2011 IEEE International Conference.
Tonci F. et al., "Buffer Constraints for Rate-Distortion Optimization in Mobile Video Communications", Proceedings of International Symph on Signals, Circuits and Systems, Jul. 2005, pp. 71-74, Lasi, Romania (Invited Paper).
Vass, J., et al., "Efficient Three-Dimensional Wavelet Codecs for Networked Video Communication," in Proceedings of IEEE International Conference on Image Processing, Kobe, Japan, Oct. 1999, pp. 565-569.
Wadhwa, et al., "Phase-Based Video Motion Processing", ACM Transactions on Graphics (TOG) 32.4 (2013): 80.
Weinzaepfel, et al., "Deepflow: Large displacement optical flow with deep matching", Proceedings of the IEEE International Conference on Computer Vision, 2013.

\* cited by examiner

APPARATUS AND METHODS FOR VIDEO IMAGE POST-PROCESSING FOR SEGMENTATION-BASED INTERPOLATION

RELATED APPLICATIONS

This application is related to co-owned and co-pending U.S. patent application Ser. No. 15/251,980 filed Aug. 30, 2016 and entitled "Apparatus and Methods for Frame Interpolation"; and co-owned and co-pending U.S. patent application Ser. No. 15/251,896 filed Aug. 30, 2016 and entitled "Apparatus and Methods for Video Image Post-Processing for Correcting Artifacts", each of the foregoing incorporated herein by reference in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video image post-processing and in one exemplary aspect, to methods and apparatus for generating interpolated frames of data utilizing segmentation-based interpolation techniques.

Description of Related Art

Frame interpolation is a common post-processing technology that enables, for example, modern display devices to increase the perceived framerate of natively captured video data. In addition, frame interpolation techniques enable the ability to take into account the motion of pixels on the frames of video data by analyzing the spatial relationship between pixels in the initial and subsequent frame(s). One common approach of frame interpolation is to compute a displacement field (optical flow field) between a pair of images in order to determine how each pixel moves from one image to the next.

Depending upon the complexity of the background, the flow field around a moving object within a frame may "bleed" out into the surrounding areas. When interpolating a frame using this flow field, the pixels surrounding the moving object are displaced, even when these displaced pixels should otherwise be constant or moving in a way that is consistent with surrounding regions. These artifacts are displeasing to the eye and may, in certain circumstances, be minimized using optical flow algorithms by accounting for gradients.

However, when these surrounding areas are sufficiently complex (e.g., when the surrounding background contains lots of texture and other high frequency content), these optical flow algorithms fail to accurately interpolate these images. Accordingly, techniques are needed to improve upon these frame interpolation techniques, and minimize or eliminate these undesirable artifacts in order to allow, for example, modern display devices to perform to their capabilities when displaying video content that was natively captured at lesser frame rates.

SUMMARY

The present disclosure satisfies the foregoing needs by providing, inter alia, methods and apparatus for segmentation-based generation of interpolated video data.

In a first aspect of the present disclosure, an apparatus configured to generate interpolated frames of video data is disclosed. In one embodiment, the apparatus includes a video data interface configured to receive frames of video data; a processing apparatus in data communication with the video data interface; and a storage apparatus in data communication with the processing apparatus, the storage apparatus having a non-transitory computer readable medium including instructions which are configured to, when executed by the processing apparatus, cause the computerized apparatus to: obtain a first frame of video data via the video data interface; segment one or more objects within the first frame of video data; obtain a second frame of video data via the video data interface; segment one or more objects within the second frame of video data; match at least a portion of the one or more objects within the first frame of video data with the one or more objects within the second frame of video data; compute the motion of the pixels for the matched portion of the one or more objects; compute the motion of pixels associated with a background image; and generate an interpolated frame of video data, the interpolated frame of video data residing temporally between the first frame of video data and the second frame of video data.

In one variant, the computation of the motion of the pixels for the matched portion of the one or more objects includes an independent computation of an optical flow field for each of the matched one or more objects.

In another variant, the computation of the motion of pixels associated with the background image includes a computation of an optical flow field for the background image.

In yet another variant, the background image includes those portions of the first frame of video data and the second frame of video data that has not been associated with the segmented one or more objects.

In yet another variant, the match of the at least a portion of the one or more objects within the first frame of video data with the one or more objects within the second frame of video data includes the use of a histogram-based method for the determination of the matched one or more objects.

In yet another variant, the generation of the interpolated frame of video data includes generating frames of interpolated video frame data, each of the frames of interpolated video frame data residing temporally between the first frame of video data and the second frame of video data.

In yet another variant, the frames of interpolated video frame data are generated at even intervals between the first frame of video data and the second frame of video data.

In yet another variant, the frames of interpolated video frame data are generated at irregular intervals between the first frame of video data and the second frame of video data.

In a second aspect of the present disclosure, a method of generating interpolated frames of video data is disclosed. In one embodiment, the method includes causing the obtainment of a pair of frames of video data; causing the segmentation of one or more objects within the pair of frames of video data; causing the calculation of a pixel motion for the one or more objects within the pair of frames of video data; and causing the generation of an interpolated frame of video data using the calculation of the pixel motion for the one or more objects within the pair of frames of video data.

In one variant, the causing of the segmentation of the one or more objects within the pair of frames of video data includes causing the use of a pixel clustering methodology.

In another variant, the causing of the segmentation of the one or more objects within the pair of frames of video data includes causing the use of an edge detection methodology.

In yet another variant, the causing of the segmentation of the one or more objects within the pair of frames of video data includes causing the use of a variational methodology.

In yet another variant, the causing of the segmentation of the one or more objects within the pair of frames of video data includes causing the use of a convolutional neural network methodology.

In yet another variant, the causing the segmentation of the one or more objects within the pair of frames of video data results in the generation of objects within the pair of frames of video data, and wherein the method further includes: causing the performance of a pixel motion calculation on each of the objects in an independent manner.

In yet another variant, the method further includes causing the calculation of a pixel motion for a background image within the pair of frames of video data, the background image consisting of a portion of each of the pair of frames of video data not having the objects assigned thereto.

In yet another variant, the calculation of the pixel motion for the background image includes causing the calculation of the pixel motion for the background image independently from the calculation of the pixel motion calculation on each of the objects in the independent manner.

In another aspect of the present disclosure, a computing device is disclosed. In one embodiment, the computing device includes logic configured to: obtain a pair of frames of video data; segment one or more objects within the pair of frames of video data; match at least a portion of the one or more objects within a first of the pair of frames of video data with at least a portion of the one or more objects within a second of the pair of frames of video data; compute the motion of the pixels for the matched portion of the one or more objects; compute the motion of pixels associated with a background image between the first of the pair of frames of video data and the second of the pair of frames of video data; and generate an interpolated frame of video data, the interpolated frame of video data residing temporally between the first of the pair of frames of video data and the second of the pair of frames of video data.

In one variant, the computing device further includes an image sensor, the image sensor configured to capture the pair of frames of video data.

In another variant, the computing device further includes an interface module, the interface module including a display that is configured to display the interpolated frame of video data.

In yet another variant, the interface module includes a user interface, the user interface configured to receive commands from a user in order to perform the pixel motion calculations for the portion of the one or more objects as well as the background image.

In still a further aspect of the present disclosure, a computer readable storage medium is disclosed. In one embodiment, the computer readable storage medium includes instructions which are configured to, when executed by a processing apparatus: obtain a first frame of video data via the video data interface; segment one or more objects within the first frame of video data; obtain a second frame of video data via the video data interface; segment one or more objects within the second frame of video data; match at least a portion of the one or more objects within the first frame of video data with the one or more objects within the second frame of video data; compute the motion of the pixels for the matched portion of the one or more objects; compute the motion of pixels associated with a background image; and generate an interpolated frame of video data, the interpolated frame of video data residing temporally between the first frame of video data and the second frame of video data.

In another aspect of the disclosure, an integrated circuit (IC) apparatus is disclosed. In one embodiment, the IC apparatus includes logic configured to: obtain a pair of frames of video data; segment one or more objects within the pair of frames of video data; match at least a portion of the one or more objects within a first of the pair of frames of video data with at least a portion of the one or more objects within a second of the pair of frames of video data; compute the motion of the pixels for the matched portion of the one or more objects; compute the motion of pixels associated with a background image between the first of the pair of frames of video data and the second of the pair of frames of video data; and generate an interpolated frame of video data, the interpolated frame of video data residing temporally between the first of the pair of frames of video data and the second of the pair of frames of video data.

Other features and advantages of the present disclosure will immediately be recognized by persons of ordinary skill in the art with reference to the attached drawings and detailed description of exemplary implementations as given below.

All Figures disclosed herein are © Copyright 2016 GoPro, Inc. All rights reserved.

DETAILED DESCRIPTION

Implementations of the present technology will now be described in detail with reference to the drawings, which are provided as illustrative examples and species of broader genuses so as to enable those skilled in the art to practice the technology. Notably, the figures and examples below are not meant to limit the scope of the present disclosure to any single implementation or implementation, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of non-stitched/non-panoramic video content, it is readily appreciated that the principles described herein may be equally applied to other source video content including for instance the aforementioned stitched/panoramic video content. For example, when obtaining panoramic (e.g., 360°) content, two or more images may be combined. In some implementations, six or more source images may be combined (stitched together along one or more boundaries between the images) to obtain an image with a desired field of view or FOV (e.g., 360°). It is readily appreciated by one of ordinary skill given this disclosure that segmentation based interpolation may be readily applied or adapted to these panoramic/stitched images.

Methods—

Figure 1:
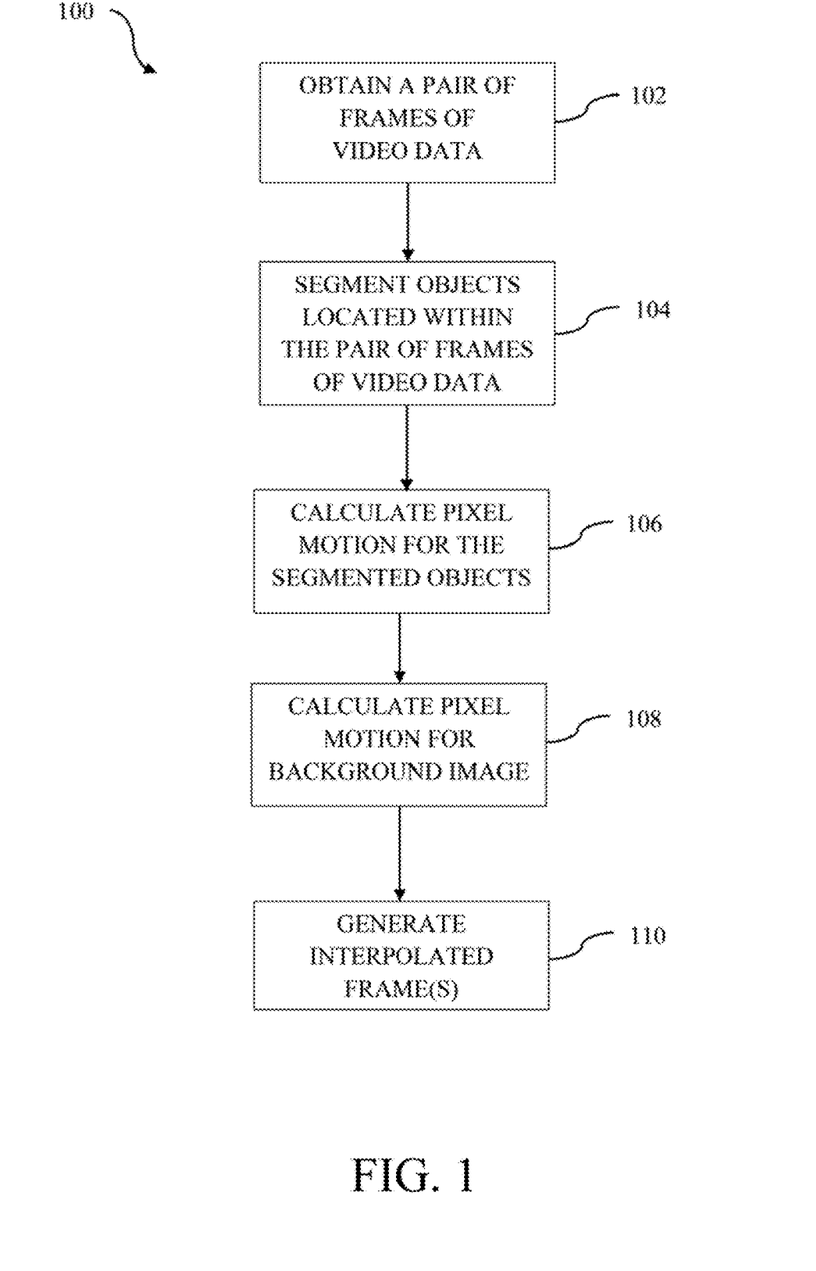
FIG. 1 is a logical flow diagram of one exemplary method for generating interpolated frame(s) of data using segmented objects, according to the present disclosure.

Referring now to FIG. 1, one exemplary generalized method 100 for generating interpolated frame(s) of video data is shown. At step 102 of the method 100, a pair of frames of video data is obtained. Obtaining the images may be made from retrieving previously captured frames of image data via an extant source (e.g., storage device), or directly (or indirectly) using an image capture device such as, for example, via the HERO family of digital video cameras offered by the assignee hereof. These frames of video data may be obtained at a variety of differing display resolutions (e.g., standard-definition, enhanced-definition, high-definition and ultra-high-definition) and within each of these differing display resolutions, these images may be obtained at a variety of differing frame rates (e.g., twenty-four (24) frames per second, twenty-five (25) frames per second, thirty (30) frames per second, sixty (60) frames per second, one-hundred twenty (120) frames per second, two-hundred forty (240) frames per second and/or other frame rates).

At step 104 of the method 100, objects located within the pair of frames of video data obtained at step 102 are segmented. In one or more implementations, objects may be segmented from known classes of objects. For example, these classes of objects may include people, animals, bikes, cars, buildings and/or other forms of known objects. Additionally, there is a variety of ways to segment these objects within these frames of data. For example, one such object segmentation technique involves the use of so-called pixel clustering methods. One such pixel clustering method is described in Barghout, Lauren; Sheynin, Jacob (2013). "Real-world scene perception and perceptual organization: Lessons from Computer Vision". Journal of Vision. 13(9): 709-709, the contents of which are incorporated herein by reference in its entirety. This methodology uses so-called k-means clustering which is an unsupervised algorithm that segments area(s) of interest from the surrounding background image. Generally speaking, k-means clustering techniques divide up an image into a number of discrete regions such that the pixels within a given region have high similarity between them, as well as, for example, having a high contrast between these grouped discrete regions. In one or more implementations, given a set of observations ($x_1$, $x_2$, . . . , $x_n$), where each observation is a d-dimensional real vector, k-means clustering partitions these n observations into an arbitrary number of k sets (with k being less than or equal to n, and k further being selectable by a user of this segmentation technique), so as to minimize the within-cluster sum of squares (WCSS). In other words, this technique utilizes the sum of the distance functions of each point in the cluster to the so-called K center, resulting in one or more objects that have been segmented from the pair of video frames.

As yet another example, object segmentation may be performed using so-called edge detection methodologies. Edge detection methodologies rely on the fact that there are often times a sharp adjustment in intensity at region boundaries surrounding an object. Accordingly, edge detection techniques are often times suitable for the purposes of object segmentation. However, the edges identified by edge detection are often times disconnected resulting in limitations in the methodologies ability to accurately segment objects. In other words, in order to segment an object within each of the pair of obtained frames of data, these segmented objects often need closed region boundaries (as opposed to disconnected edges). One such technique for closing region boundaries using edge detection methodologies involves the use of spatial-taxons as described in Barghout, Lauren. Visual Taxometric approach Image Segmentation using Fuzzy-Spatial Taxon Cut Yields Contextually Relevant Regions. Communications in Computer and Information Science (CCIS). Springer-Verlag. 2014, the contents of which being incorporated herein by reference in its entirety. Accordingly, by using the aforementioned spatial-taxons, edge detection methodologies may be applied to the so-called spatial-taxon region of an image, which is particularly useful when, for example, the disconnected edge is part of an illusory contour or structure.

As yet another example, object segmentation may be performed using so-called variational methods which are able to segment objects with respect to a specific energy function associated with the image. Variational methods are described in Chan, T. F.; Vese, L. (2001). "Active contours without edges". *IEEE Transactions on Image Processing*. 10 (2): 266-277 (hereinafter "Chan"), the contents of which are incorporated herein by reference in its entirety. Variational methods are particularly well suited in instances in which boundaries are not necessarily defined by image gradients. For example, as set forth in Chan, the variational method described therein utilizes Mumford-Shah segmentation techniques and the level set method. Accordingly, image processing on the obtained frames of data do not need to be initially smoothed and hence, even if the frames of data themselves are noisy, the locations of these boundaries for identified objects may be detected, thereby resulting in an accurate detection of these objects that are ultimately segmented within these obtained frames of video data.

As yet another example, object segmentation may be performed using so-called neural network methodologies such as those described in Kendall, A., Badrinarayanan, V., & Cipolla, R. (2015). Bayesian segnet: Model uncertainty in deep convolutional encoder-decoder architectures for scene understanding. *arXiv preprint arXiv*:1511.02680; and Badrinarayanan, V., Kendall, A., & Cipolla, R. (2015). Segnet: A deep convolutional encoder-decoder architecture for image segmentation. *arXiv preprint arXiv*:1511.00561, the contents of each of the foregoing being incorporated herein by reference in their entireties. The aforementioned neural network methodologies are referred to as a so-called Bayesian SegNet, which predicts pixel-wise class labels along with a measure of model uncertainty for these predicted pixel classifications. Neural network methodologies are advantageous in that they are efficient in terms of both memory requirements as well as the algorithm's ability to limit computational time during the object segmentation process as compared with other more computationally expensive object segmentation techniques.

In one or more implementations, scale invariant feature transform (SIFT) methodologies are utilized in order to detect, describe and match scale space features. SIFT characterizes the obtained frames by transforming a frame of obtained video data into a collection of local feature vectors, each of which is invariant to image translation, scaling, and rotation. These scale-invariant features are efficiently identified using a staged filtering approach. The first stage identifies key locations in scale space by looking for locations within the frame that are maxima or minima of, for example, a difference-of-Gaussian function. Each point is used to generate a feature vector, also known as a so-called SIFT key. These SIFT keys may then be utilized in, for example, a nearest-neighbor approach to identify objects which are then segmented from the frame at step 104. SIFT methodologies are described in, for example, Lowe, D. G. (1999). Object recognition from local scale-invariant features. In *Computer vision, 1999. The proceedings of the seventh IEEE international conference on* (Vol. 2, pp. 1150-1157). IEEE, the contents of which are incorporated herein by reference in its entirety.

In one or more implementations, so-called speeded up robust features (SURF) methodologies are utilized in order to detect, describe and match scale space features. SURF descriptors are similar to the aforementioned SIFT keys; but generally contain a reduced complexity as compared with SIFT. The first step in the SURF methodology involves fixing a reproducible orientation based on information from a circular region around a point of interest within the frame of video data. Next, a square region is constructed that is aligned to the selected orientation and the SURF descriptor is extracted. SURF methodologies are described in, for example, Bay, H., Tuytelaars, T., & Van Gool, L. (2006, May). Surf: Speeded up robust features. In *European conference on computer vision* (pp. 404-417). Springer Berlin Heidelberg, the contents of which are incorporated herein by reference in its entirety.

Additionally, in one or more implementations, two or more of the aforementioned segmentation techniques may be utilized in order to segment the objects located within the pair of frames of video data at step 104. For example, in one or more implementations, for a given pair of frames of video data two or more separate segmentation algorithms are applied to these given frames of data independently. The outputs for each of these segmentation algorithms are then applied to a combining algorithm which in turn will output a combined output. Methods and apparatus for the combining of results of independent base algorithms for solving a background segmentation task are described in co-owned and co-pending U.S. patent application Ser. No. 15/177,310 filed on Jun. 8, 2016 and entitled "Combining Independent Solutions to an Image or Video Processing Task", the contents of which are incorporated herein by reference in its entirety.

At step 106, the pixel motion for the segmented objects identified at step 104 is calculated between the pair of frames of obtained video data. These pixel motion calculations enable, for instance, the later calculation of the interpolated frame of data at step 110. For example, in so-called dense pixel motion calculations, optical flow algorithms are utilized in order to determine the optical flow of the pixels for the segmented objects identified at step 104. Alternatively, rather than utilizing a dense pixel motion calculation, a block-based pixel motion calculation may be utilized. In block-based pixel motion calculations, pixels are grouped into blocks of pixels (e.g., 4×4 sets of pixels, 8×8 sets of pixels, 4×8 sets of pixels and other sets of pixels) and the motion for these blocks of pixels are estimated between frames. Such block-based pixel motion calculations are advantageous as the calculations involved are less computationally expensive and time-consuming than the aforementioned optical flow calculations. Additionally, in one or more implementations, the pixel motion calculation is calculated separately for each of the objects that have been segmented. In other words, rather than computing, for example, the optical flow for the whole frame at once, the optical flow is computed on an object-by-object basis, resulting in a more accurate optical flow calculation for the identified objects as well as the surrounding areas of these objects. Additionally, these pixel motion calculations may be calculated at any intermediate division of time between frames. For example, these pixel motion calculations may be made at a tenth of a step (e.g., at a tenth of a time interval between the obtained frames of video data); a third of a step (e.g., at a third of a time interval between the obtained frames of video data); a half of a step (e.g., at a time halfway between the obtained frames of video data); or literally any other intermediate division of time desired.

At step 108, the pixel motion for the background image is calculated between the pair of frames of obtained video data. The background image may, for example, include those areas of the frame of video data in which objects have not been previously segmented at step 104. In other words, for each portion of the image that does not have a pixel motion value associated with it because, for example, this portion of the image has not been previously segmented into an object, a separate calculation is performed for this portion as a whole. In other words, areas of the image that have already been segmented out will be masked out of the background image pixel motion calculation. Accordingly, a background image pixel calculation is utilized to generate, for example, an optical flow for the background image. These pixel motion calculations for the background image enable, for instance, the later calculation of the interpolated frame of data at step 110. Additionally, and similar to the pixel motion calculations performed for the segmented objects at step 106, these pixel motion calculations may be calculated at any intermediate division of time between frames, such as the aforementioned tenth of a step, third of a step, half of a step, or literally any other intermediate division of time desired.

At step 110, the interpolated frame(s) of data are generated using the pixel motion calculations generated for the segmented objects at step 106, and the background image pixel motion calculation generated for the background image at step 108. As previously discussed herein, the interpolated frame(s) of data may be generated for any desired intermediate division of time (e.g., a tenth of a step, a third of a step, a half of a step and other portions of a step). In addition, more than one interpolated frame of data may be generated for the pair of frames of video data obtained at step 102. For example, nine (9) interpolated frames of video data may be generated, with each of these interpolated frames occurring at even intervals between the pair of frames of video data obtained at step 102. Such an interpolation generation may be desirable when, for example, displaying a video at ten (10) times its natively captured frame rate. As yet another example, four (4) interpolated frames of video data may be generated such that these interpolated frames of video data are generated at irregular intervals (e.g., at a tenth of a step, a half a step, six-tenths of a step, and at nine-tenths of a step). Such irregular intervals for the generation of the interpolated frames of video data may be valuable in instances in which, for example, it is desired to gradually ramp down the speed of a portion of a video (e.g., for the purposes of slow motion video playback).

Usage Scenarios—

Figure 2:
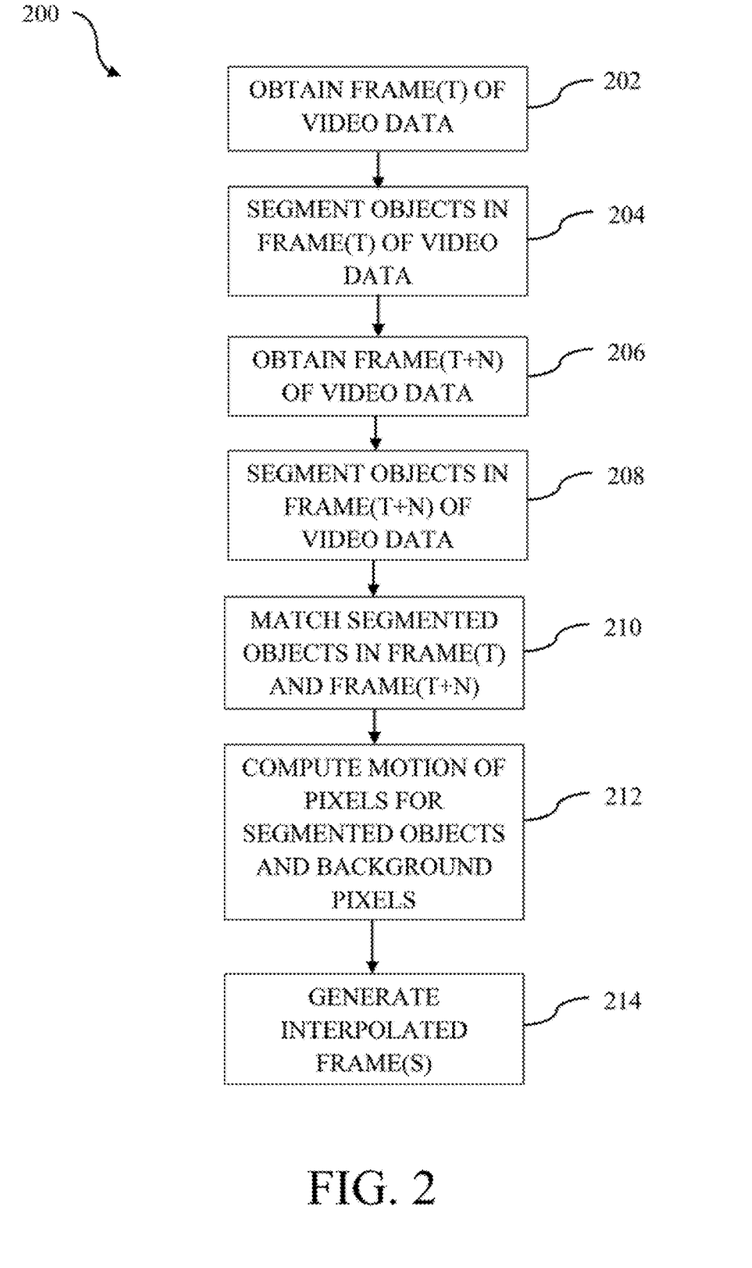
FIG. 2 is a logical flow diagram of another exemplary method for generating interpolated frame(s) of data using segmented objects, according to the present disclosure.
Figure 3A:
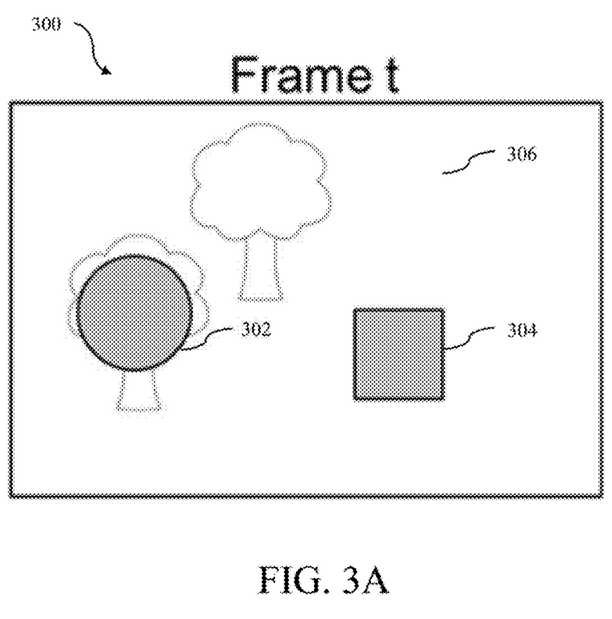
FIG. 3A is a graphical representation of a captured frame of data (frame (t)), according to the present disclosure.
Figure 3B:
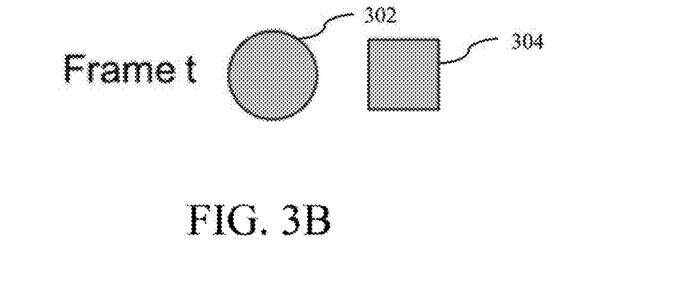
FIG. 3B is a graphical representation of segmented objects from the captured frame of data illustrated in FIG. 3A, according to the present disclosure.
Figure 3C:
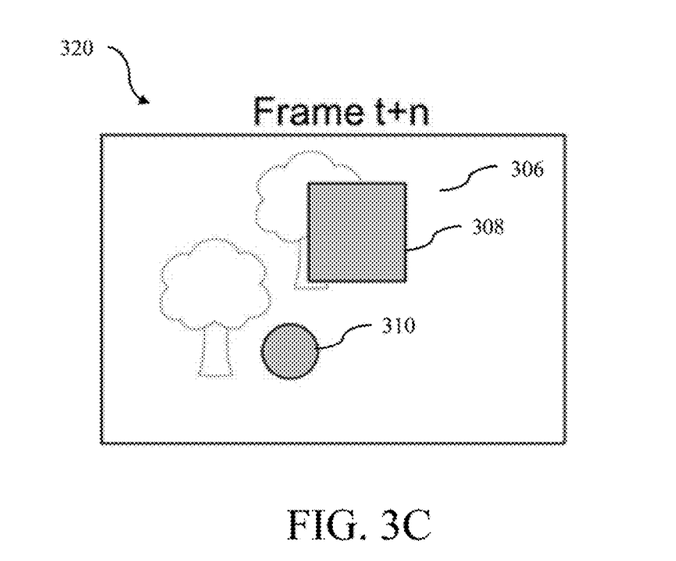
FIG. 3C is a graphical representation of a captured frame of data (frame (t+n)), according to the present disclosure.

Referring now to FIG. 2, one exemplary method for generating interpolated frame(s) of data 200 using for, for example, the frames of data illustrated in FIG. 3A and FIG. 3C, is shown and described in detail. At step 202, the method 200 first obtains a first frame of video data (e.g., frame t 300 illustrated in FIG. 3A). This first frame of data may be obtained directly through, for example, an imaging sensor, or alternatively may be obtained indirectly via, for example, a previously captured image stored within a storage device. For example, and as is illustrated in FIG. 3A, obtained frame t 300 includes a first object 302, a second object 304, as well as a surrounding background image 306.

At step 204, objects are segmented from the first frame of video data obtained at step 202. This object segmentation may include any number of known object segmentation techniques including, for example, the aforementioned pixel clustering methods, edge detection methods, variational methods, and convolutional neural network methods. Additionally, combinations of the foregoing may be utilized in order to segment objects within the obtained first frame of video data. Referring now to FIGS. 3A and 3B, within the captured scene 300, one exemplary scenario for the segmentation of objects is shown. As can be seen in FIG. 3A, two objects are identified including a circle shaped object 302 and a square shaped object 304. Accordingly, by using, for example, the aforementioned pixel clustering methodologies previously described herein, the circle shaped object 302 and the square shaped object 304, may be segmented out from the first frame of video data as is illustrated in FIG. 3B.

At step 206, the method 200 obtains a second frame of video data (e.g., frame t+n 320 illustrated in FIG. 3C). This second frame of data, similar to the capture of the first frame of video data at step 202, may be either obtained directly through, for example, an imaging sensor, or alternatively obtained indirectly via, for example, a previously captured image stored within a storage device. For example, and as is illustrated in FIG. 3C, obtained frame t+n 320 includes a first object 310, a second object 308, as well as a surrounding background image 306. In one or more implementations, the scene depicted in frame t+n 320 will be captured as an adjacent frame of video data to the scene depicted in frame t 300.

However, it is appreciated that the scene depicted in frame t+n may not always reside in an immediately adjacent frame of video data to the scene depicted in frame t. In other words, in certain image processing situations it may be desirable to generate an interpolated frame of video data between frames of video that are not immediately adjacent to one another. For example, during the capture of multiple frames of video data, an undesirable object and/or an undesirable imaging artifact may be introduced into one or more of the frames of the multiple frames of captured video data. Accordingly, it may be desirable to, for example, remove these one or more captured frames of video data and replace these removed frames with generated interpolated frames of video data from surrounding frames of video data that do not contain this undesirable object and/or undesirable imaging artifact.

For example, three (3) frames of video data are captured (i.e., frame t, frame t+1, and frame t+2), and during image post-processing an undesirable object is found within frame t+1. Accordingly, it may be desirable to remove frame t+1 from the three (3) frames of video data that were previously captured and instead replace frame t+1 (or relevant portions thereof) with an interpolated frame of video data t+1 using data from frames t and t+2 which do not contain the aforementioned undesirable object or undesirable artifact. These and other variations would be readily apparent to one of ordinary skill given the contents of the present disclosure.

Figure 3D:
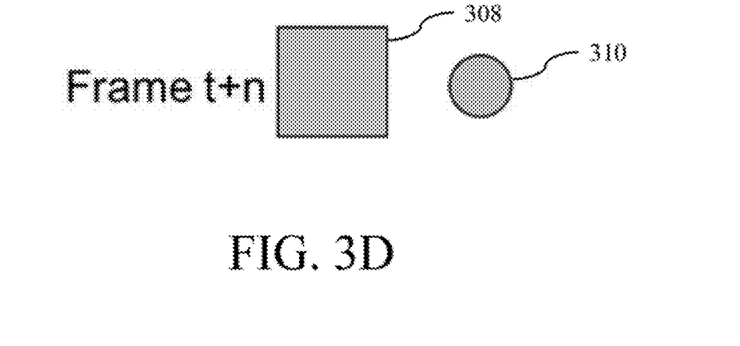
FIG. 3D is a graphical representation of segmented objects from the captured frame of data illustrated in FIG. 3C, according to the present disclosure.

At step 208, objects are segmented from the second frame of video data obtained at step 206. Similar to step 204, this object segmentation may include any number of known object segmentation techniques including, for example, pixel clustering methods, edge detection methods, variational methods, and convolutional neural network methods. Referring now to FIGS. 3C and 3D, within the captured scene 320, one exemplary scenario for the segmentation of objects is shown. As can be seen in FIG. 3C, two objects are identified including a circle shaped object 310 and a square shaped object 308. Accordingly, by using, for example, the aforementioned segmentation methodologies previously described herein, the circle shaped object 310 and the square shaped object 308, may be segmented out from the second frame of video data as is illustrated in FIG. 3D.

At step 210, objects that were segmented in the first frame of captured video data and the second frame of captured video data are matched with objects that were segmented in the second frame of captured video data using an object matching algorithm. In one exemplary embodiment, objects are matched between frames of video data by comparing the histograms for these segmented objects. As a brief aside, a histogram is a graphical representation of numerical data. In order to construct a histogram, the first step of the process is to measure a quantitative variable (e.g., a color value, an intensity value, and other quantitative variables associated with pixels) for each pixel of the detected object. Next, these measured quantitative variables are separately grouped and the frequencies associated with these measured quantitative variables are summed together by grouping. Accordingly, by comparing the histograms between the captured frames of video data, these segmented objects may be correlated with one another and matches may be determined. One exemplary equation for the matching of histograms using equation (1) as illustrated below.

$$d(H_1, H_2) = \frac{\sum_I (H_1(I) - \overline{H}_1)(H_2(I) - \overline{H}_2)}{\sqrt{\sum_I (H_1(I) - \overline{H}_1)^2 \sum_I (H_2(I) - \overline{H}_2)^2}} \quad \text{Equation (1)}$$

Where:

$$\overline{H}_k = \frac{1}{N} \sum_J H_k(J)$$

In one or more implementations, the histograms for the detected objects may be compared using the so-called Bhattacharyya distance. As a brief aside, the use of Bhattacharyya distance calculations measures the similarity of the probability distributions associated with the constructed histograms. The Bhattacharyya distance calculation is illustrated below as equation (2):

$$d(H_1, H_2) = \sqrt{1 - \frac{1}{\sqrt{\overline{H_1}\overline{H_2}N^2}} \sum_I \sqrt{H_1(I) \cdot H_2(I)}} \quad \text{Equation (2)}$$

Figure 3E:
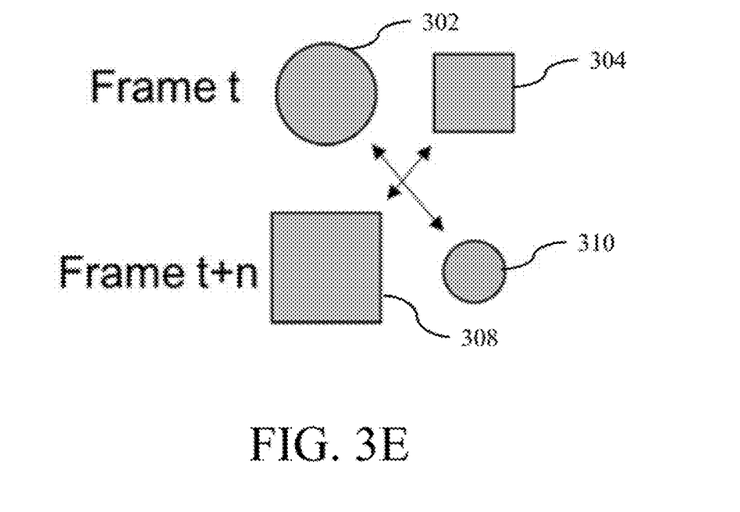
FIG. 3E is a graphical representation of object matching of the segmented objects illustrated in FIGS. 3B and 3D, according to the present disclosure.

Referring now to FIG. 3E, using the aforementioned matching of histograms it may be seen that object 302 located in frame t 300 has been correlated (matched) with object 310 in frame t+n 320. Similarly, object 304 in frame t 300 has been correlated (matched) with object 308 in frame t+n 320. This matching has occurred despite the fact that the relative sizes (as a result of, for example, the respective objects either moving towards or away from the image capturing device) differs between frame t 300 and frame t+n 320.

Figure 3F:
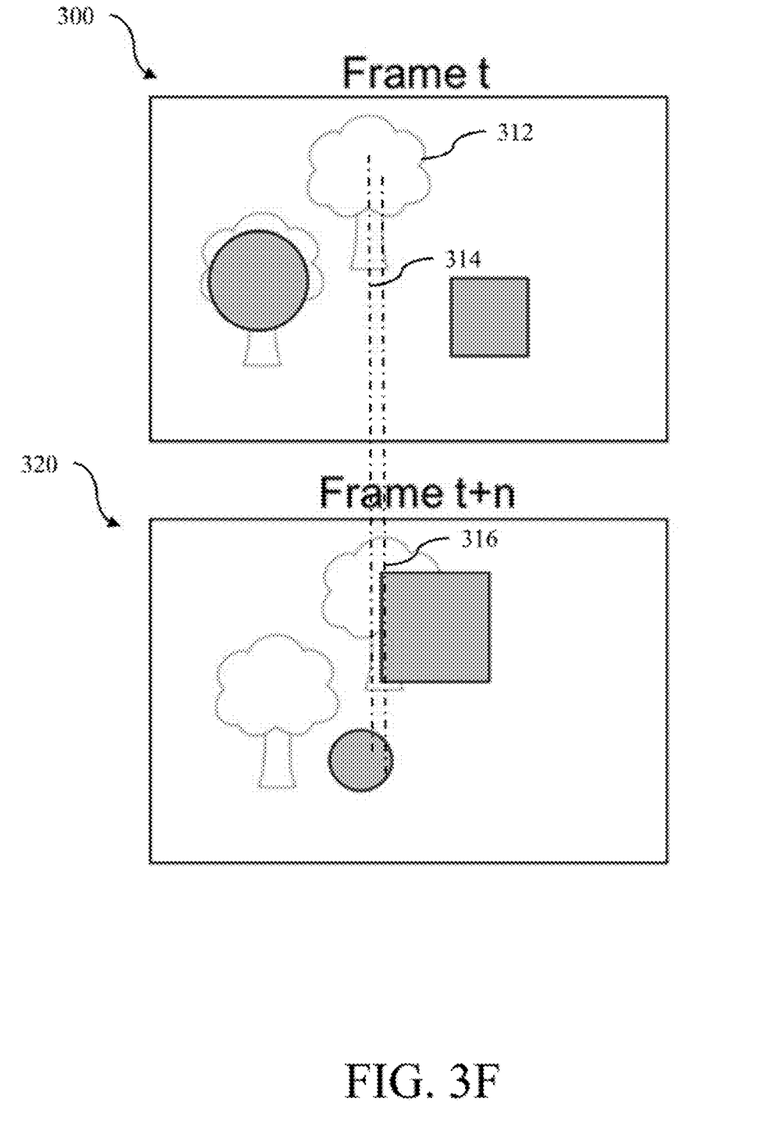
FIG. 3F is a graphical representation of computed motion of the background image contained within FIG. 3A and FIG. 3C, according to the present disclosure.
Figure 3G:
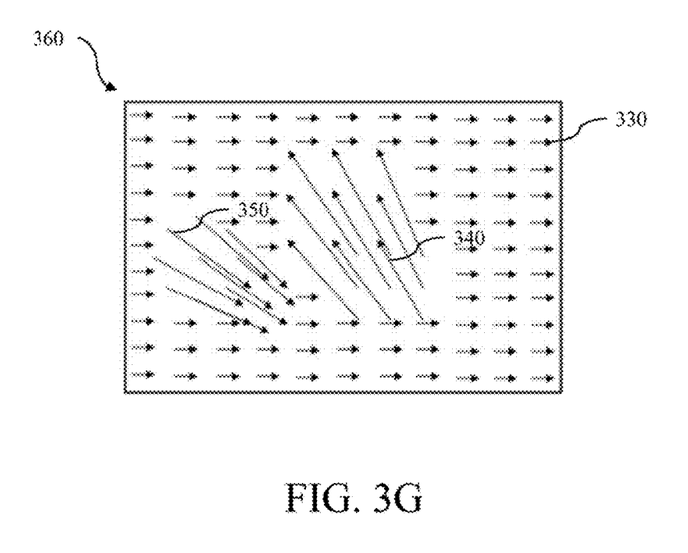
FIG. 3G is a graphical representation of the pixel motion flow fields of the objects and background image contained within FIG. 3A and FIG. 3C, according to the present disclosure.

Referring now to step 212 of method 200, the motion of the pixels associated with the segmented objects (e.g., object 302 and object 304) are computed. Accordingly, herein lies a salient advantage of the methodologies described herein. Namely, by computing the motion of pixels for each of these objects separately, a more accurate depiction of the motion of the pixels for each of these objects may be used in the generation of the interpolated frame(s) of data at step 214. In other words, and in one or more implementations in which the computed motion of pixels uses an optical flow calculation, the optical flow values are computed separately for each of the pairs of matched objects that were determined at step 210. Additionally, for pixel locations that are not located within any of these segmented objects (e.g., the image background 306), these motion values are filled in with those computed from the whole frame pixel motion calculation. For example, FIG. 3F illustrates the concept associated with calculating the whole frame pixel motion calculation by comparing the center line 314 of object 312 in frame t 300 with the centerline 316 of object 312 in frame t+n 320. FIG. 3G illustrates one such exemplary optical flow field 360 for the interpolated frame of data generated at step 214. Namely, the optical flow values 350 associated with the matched objects 302, 310, the optical flow values 340 associated with the matched objects 304, 308, and the optical flow values 330 for the background image 306 are shown.

Exemplary Apparatus—

Figure 4:
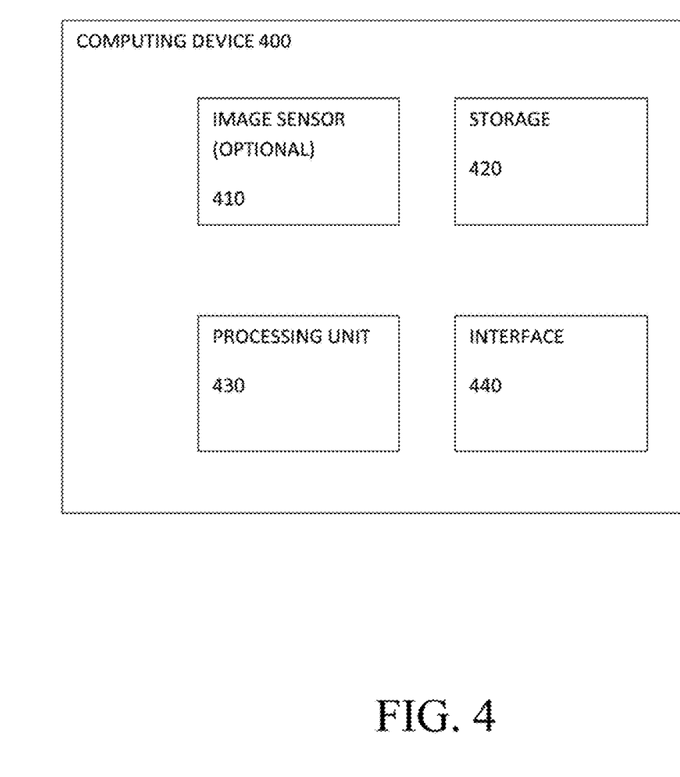
FIG. 4 is a block diagram of an exemplary implementation of a computing device, useful in performing the methodologies described herein.

FIG. 4 is a block diagram illustrating an embodiment of a computing device, in accordance with the principles described herein. The computing device 400 of the embodiment of FIG. 4 includes an optional image sensor 410, a storage module 420, a processing unit 430, and an interface module 440. The various components of the computing device 400 are communicatively coupled, for instance via a communications bus not illustrated herein, thereby enabling communication between the various ones of the components.

The image sensor 410 is configured to convert light incident upon the image sensor chip into electrical signals representative of the light incident upon the image sensor. Such a process is referred to as "capturing" image or video data, and capturing image data representative of an image is referred to as "capturing an image" or "capturing a frame". The image sensor may be configured to capture images at one or more frame rates, and may be configured to capture an image in a first interval of time and then wait a second interval of time before capturing another image (during which no image data is captured). The image sensor may include a charge-coupled device ("CCD") image sensor, a complementary metal-oxide semiconductor ("CMOS") image sensor, or any other suitable image sensor configured to convert captured light incident upon the image sensor chip into image data. Moreover, while the image sensor 410 is illustrated as forming part of the computing device 400, it is appreciated that in one or more other implementations, image sensor 410 may be located remote from computing device 410 and instead, images captured via the image sensor may be communicated to the computing device via the interface module 440.

The methodologies described herein, as well as the operation of the various components of the computing device, may be controlled by the processing unit 430. In one embodiment, the processing unit is embodied within one or more integrated circuits and includes a processor and a memory that includes a non-transitory computer-readable storage medium storing computer-executable program instructions for performing the image post-processing methodologies described herein, among other functions. In such an embodiment, the processor can execute the computer-executable program instructions to perform these functions. It should be noted that the processing unit may implement the image post-processing methodologies described herein in hardware, firmware, or a combination of hardware, firmware, and/or software. In some embodiments, the storage module 420 stores the computer-executable program instructions for performing the functions described herein for execution by the processing unit 430.

The storage module 420 includes a non-transitory computer-readable storage medium configured to store data. The storage module may include any suitable type of storage, such as random-access memory, solid state memory, a hard disk drive, buffer memory, and other types of storage media. The storage module may store image data captured by the image sensor 410. In addition, the storage module may store a computer program or software useful in performing the post-processing methodologies described herein with reference to FIGS. 1 and 2 utilizing the image or video data captured by image sensor 410.

The interface module 440 allows a user of the computing device to perform the various processing steps associated with the methodologies described herein. For example, the interface module 440 may allow a user of the computing device to begin or end capturing images or video, may allow a user to perform the object segmentation calculations, may allow a user to match objects between frames of video data, and may allow a user to perform the pixel motion calculations (e.g., optical flow calculations). Additionally, the interface module 440 may allow a user to generate interpolated frame(s) of data as well as receive image or video data from a remote image sensor. Moreover, the interface module 440 optionally includes a display in order to, inter alia, display the interpolated frame(s) of data and/or the captured frame(s) of data.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting;

rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and minicomputers, whether desktop, laptop, or otherwise, mainframe computers, workstations, servers, personal digital assistants (PDAs), handheld computers, wearable computing devices, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including without limitation, for example, C/C++, C#, Fortran, COBOL, MATLAB™, PASCAL, Python, assembly language, markup languages (e.g., HTML, SGML, XML, VoXML), as well as object-oriented environments including without limitation, object-oriented languages such as the Common Object Request Broker Architecture (CORBA), Java™ (including J2ME, Java Beans), Binary Runtime Environment (e.g., BREW).

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A computerized apparatus configured to generate interpolated frames of video data, the apparatus comprising:
   a video data interface configured to receive a plurality of frames of video data;
   a processing apparatus in data communication with the video data interface; and
   a storage apparatus in data communication with the processing apparatus, the storage apparatus having a non-transitory computer readable medium comprising instructions which are configured to, when executed by the processing apparatus, cause the computerized apparatus to:
   obtain a first frame of video data via the video data interface;
   segment one or more objects within the first frame of video data;
   obtain a second frame of video data via the video data interface;
   segment one or more objects within the second frame of video data;
   match at least a portion of the one or more objects within the first frame of video data with the one or more objects within the second frame of video data;
   compute a motion of pixels for the matched portion of the one or more objects;
   compute a motion of pixels associated with a background image, the computed motion of pixels associated with the background image having the one or more objects segmented out prior to the computation of the motion of the pixels associated with the background image; and
   generate an interpolated frame of video data via use of the computed motion of pixels for the matched portion of the one or more objects and the computed motion of pixels associated with the background image, the interpolated frame of video data residing temporally between the first frame of video data and the second frame of video data.

2. The computerized apparatus of claim 1, wherein the computation of the motion of the pixels for the matched portion of the one or more objects comprises an independent computation of an optical flow field for each of the matched one or more objects.

3. The computerized apparatus of claim 2, wherein the computation of the motion of the pixels associated with the background image comprises a computation of an optical flow field for the background image.

4. The computerized apparatus of claim 1, wherein the match of the at least a portion of the one or more objects within the first frame of video data with the one or more objects within the second frame of video data comprises the use of a histogram-based method for determination of the matched one or more objects.

5. The computerized apparatus of claim 1, wherein the generation of the interpolated frame of video data comprises generating a plurality of frames of interpolated video frame data, each of the plurality of frames of interpolated video frame data residing temporally between the first frame of video data and the second frame of video data.

6. The computerized apparatus of claim 5, wherein the plurality of frames of interpolated video frame data are generated at even intervals between the first frame of video data and the second frame of video data.

7. The computerized apparatus of claim 5, wherein the plurality of frames of interpolated video frame data are generated at irregular intervals between the first frame of video data and the second frame of video data.

8. A method of generating interpolated frames of video data, comprising:
 causing obtainment of a pair of frames of video data;
 causing segmentation of one or more objects within the pair of frames of video data, the segmentation resulting in one or more background images not having the one or more objects disposed therein;
 causing calculation of a pixel motion for the one or more objects within the pair of frames of video data;
 causing calculation of a pixel motion for the one or more background images not having the one or more objects disposed therein; and
 causing generation of an interpolated frame of video data using the calculation of the pixel motion for the one or more objects within the pair of frames of video data and the calculation of the pixel motion for the one or more background images.

9. The method of claim 8, wherein the causing of the segmentation of the one or more objects within the pair of frames of video data comprises causing the use of a pixel clustering methodology.

10. The method of claim 8, wherein the causing of the segmentation of the one or more objects within the pair of frames of video data comprises causing the use of an edge detection methodology.

11. The method of claim 8, wherein the causing of the segmentation of the one or more objects within the pair of frames of video data comprises causing the use of a variational methodology.

12. The method of claim 8, wherein the causing of the segmentation of the one or more objects within the pair of frames of video data comprises causing the use of a convolutional neural network methodology.

13. The method of claim 8, wherein the causing the segmentation of the one or more objects within the pair of frames of video data results in the generation of a plurality of objects within the pair of frames of video data, and wherein the method further comprises:

causing the performance of a pixel motion calculation on each of the plurality of objects in an independent manner.

14. A computing device, comprising:
 logic configured to:
  obtain a pair of frames of video data;
  segment one or more objects within the pair of frames of video data, the segmentation of the one or more objects within the pair of frames of video data resulting in generation of a background image not having the one or more objects disposed therein;
  match at least a portion of the one or more objects within a first of the pair of frames of video data with at least a portion of the one or more objects within a second of the pair of frames of video data;
  compute a motion of pixels for the matched portion of the one or more objects;
  compute a motion of pixels associated with the background image between the first of the pair of frames of video data and the second of the pair of frames of video data the background image having the one or more objects segmented out prior to the computation of the motion of the pixels associated with the background image; and
  generate an interpolated frame of video data via use of the computed motion of the pixels for the matched portion of the one or more objects and use of the computed motion of the pixels associated with the background image, the interpolated frame of video data residing temporally between the first of the pair of frames of video data and the second of the pair of frames of video data.

15. The computing device of claim 14, further comprising an image sensor, the image sensor configured to capture the pair of frames of video data.

16. The computing device of claim 14, further comprising an interface module, the interface module comprising a display that is configured to display the interpolated frame of video data.

17. The computing device of claim 16, wherein:
 the interface module comprises a user interface, the user interface configured to receive a plurality of commands from a user in order to perform the motion of pixels computations for the matched portion of the one or more objects as well as the background image.

18. The computing device of claim 14, wherein the logic comprises a processing unit and a non-transitory computer-readable storage medium having computer-executable program instructions stored thereon.

19. The computing device of claim 18, wherein the match the at least the portion of the one or more objects within the first of the pair of frames of video data with the at least the portion of the one or more objects within the second of the pair of frames of video data utilizes a comparison of histograms for the one or more objects.

20. The computing device of claim 19, wherein the comparison of the histograms for the one or more objects comprises a correlation of individual ones of the one or more objects.

* * * * *

UNITED STATES PATENT AND TRADEMARK OFFICE
CERTIFICATE OF CORRECTION

PATENT NO. : 10,134,114 B2
APPLICATION NO. : 15/270971
DATED : November 20, 2018
INVENTOR(S) : Balineedu Chowdary Adsumilli et al.

It is certified that error appears in the above-identified patent and that said Letters Patent is hereby corrected as shown below:

In the Claims

Currently reads (Claim 14 – Column 16):
"14. A computing device, comprising:
logic configured to:
    obtain a pair of frames of video data;
    segment one or more objects within the pair of frames
        of video data, the segmentation of the one or more
        objects within the pair of frames of video data
        resulting in generation of a background image not
        having the one or more objects disposed therein;
    match at least a portion of the one or more objects
        within a first of the pair of frames of video data with
        at least a portion of the one or more objects within a
        second of the pair of frames of video data;
    compute a motion of pixels for the matched portion of
        the one or more objects;
    compute a motion of pixels associated with the back-
        ground image between the first of the pair of frames
        of video data and the second of the pair of frames of
        video data the background image having the one or
        more objects segmented out prior to the computation
        of the motion of the pixels associated with the
        background image; and
    generate an interpolated frame of video data via use of
        the computed motion of the pixels for the matched
        portion of the one or more objects and use of the
        computed motion of the pixels associated with the
        background image, the interpolated frame of video
        data residing temporally between the first of the pair Signed and Sealed this
Fifth Day of March, 2019

Andrei Iancu
*Director of the United States Patent and Trademark Office* of frames of video data and the second of the pair of
frames of video data."

Should read:
-- 14. A computing device, comprising:
logic configured to:
    obtain a pair of frames of video data;
    segment one or more objects within the pair of frames
        of video data, the segmentation of the one or more
        objects within the pair of frames of video data
        resulting in generation of a background image not
        having the one or more objects disposed therein;
    match at least a portion of the one or more objects
        within a first of the pair of frames of video data with
        at least a portion of the one or more objects within a
        second of the pair of frames of video data;
    compute a motion of pixels for the matched portion of
        the one or more objects;
    compute a motion of pixels associated with the back-
        ground image between the first of the pair of frames
        of video data and the second of the pair of frames of
        video data, the background image having the one or
        more objects segmented out prior to the computation
        of the motion of the pixels associated with the
        background image; and
    generate an interpolated frame of video data via use of
        the computed motion of the pixels for the matched
        portion of the one or more objects and use of the
        computed motion of the pixels associated with the
        background image, the interpolated frame of video
        data residing temporally between the first of the pair
        of frames of video data and the second of the pair of
        frames of video data. --